United States Patent Office 3,502,623
Patented Mar. 24, 1970

---

3,502,623
POLYESTERS OF CAPROLACTONE, TEREPHTHALIC ACID, AND ETHYLENE GLYCOL
Neville Robert Hurworth and Derek McHardy Brewis, Runcorn, England, assignors to Imperial Chemical Industries Limited, London, England, a corporation of Great Britain
No Drawing Filed May 8, 1967, Ser. No. 636,619
Claims priority, application Great Britain, May 18, 1966, 22,041/66
Int. Cl. C08g *17/08, 17/02;* C09j *3/16*
U.S. Cl. 260—76     7 Claims

ABSTRACT OF THE DISCLOSURE

Copolyesters, having a specified minimum molecular weight, comprising poly(ethylene terephthalate) having specified proportions of units derived from ε-caprolactone or derivatives thereof incorporated into the macromolecular chains, such copolyesters being useful as adhesive and coating materials. Also, a process for the preparation of such copolyesters which comprises heating together ε-caprolactone, or a derivative thereof, and poly(ethylene terephthalate) or poly(ethylene terephthalate)-forming compounds. The copolyesters may have a proportion of the poly(ethylene terephthalate) units replaced by poly(ethylene isophthalate) units, may be cross-linked and may be blended with other resinous or polymeric materials.

---

This invention realtes to polyesters, more particularly to copolyesters containing lactone residues.

It is known to polymerise lactones in the presence of one or more initiators having one or more groups containing active hydrogen atoms (for example —OH, —NH₂ or —COOH groups) The products of such reactions are said to be useful as intermediates in the preparation of polyurethane resins and as plasticisers.

We have now found that the modification of poly(ethylene-terephthalate) so as to incorporate into the macromolecular chain certain proportions of lactone residues, being units of the structure I below:

—O—(CH₂)₅—CO— hereinafter referred to as 6-oxycaproyl units, results in copolymeric products which, if they satisfy certain minimum molecular weight requirements, show surprising said to be useful as intermediates in the preparation of shaped articles. It should be understood that the materials only achieve utility, according to our invention, so long as they have the combination of proportions of 6-oxycaproyl units within the range specified below and at least the minimum molecular weight specified below.

Thus, according to the present invention we provide copolyesters having a reduced viscosity, as hereinafter defined of at least 0.3 decilitre gm.⁻¹, measured on 0.5 gm. decilitre⁻¹ solutions in o-chlorophenol at 25° C., macromolecular chains of which comprise 6-oxycaproyl units, units having the structure II below:

—O—(CH₂)₂—O—     (II)

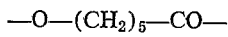

hereinafter referred to as ethylene dioxy units and units having the structure III below:

(III)

hereinafter referred to as terephthaloyl units, wherein the molar ratios of terephthaloyl units to 6-oxycaproyl units in the macromolecular chains are in the range 30:70 to 80:20 and wherein the molar ratios of terephthaloyl units to ethylene dioxy units in the macromolecular chains are substantially 1:1.

According to a further embodiment of our invention we provide a process for the preparation of the copolyesters according to the present invention which comprises heating together a compound, hereinafter referred to as an ester-generating compound, capable of forming 6-oxycaproyl units in the macromolecular chains with a compound or compounds, hereinafter referred to as a terephthalate-generating compound or compounds, capable of forming terephthaloyl and ethylene dioxy units in the macromolecular chains, the molar proportions of ester-generating compound and the terephthalate-generating compound or compounds being such as to give a molar ratio of terephthaloyl units to 6-oxycaproyl units in the copolyester macromolecular chains in the range 30:70 to 80:20 and the reaction conditions being such that the copolyester product has a reduced viscosity, as hereinafter defined, of at least 0.3 decilitre gm.⁻¹, measured on 0.5 gm. decilitre⁻¹ solution in o-chlorophenol at 25° C.

Factors, known in the art, which generally affect molecular weight, and hence reduced viscosity, in polycondensation reactions include (i) the choice of reaction conditions, e.g. temperature, pressure and reaction time to give a high degree of chemical conversion, and (ii) the purity of the starting materials and the presence or absence of reactive monofunctional materials which may reduce the molecular weight of the product. A chemist having ordinary skill in the art of polycondensation will readily discover the conditions required to achieve the molecular weights corresponding to the reduced viscosities required in the polymers of our invention by means of a few preliminary experiments.

The ester-generating compound, as hereinbefore defined, is preferably ε-caprolactone, but any other compound capable of yielding 6-oxycaproyl units in the macromolecular chains may be used if desired. Examples of such compounds include particularly poly-ε-caprolactone and also 6-hydroxycaproic acid, acyl, preferably acetyl, derivatives of 6-hydroxycaproic acid and esters, preferably those derived from alkyl alcohols having from 1 to 6 carbon atoms on account of availability and cost, of 6-hydroxycaproic acid and its acyl derivates. Mixtures of such compounds may be used if desired.

The terephthalate-generating compounds, as hereinbefore defined, may be, for example, terephthalic acid and ethylene glycol; esters of terephthalic acid, preferably dimethyl terephthalate, and ethylene glycol; bis(β-hydroxyethyl) terephthalate; and poly(ethylene terephthalate). Mixtures of such compounds may be used if desired. In general it may be said that any compounds or mixtures of compounds which, on polycondensation, will yield poly(ethylene terephthalate) are suitable for use as terephthalate-generating compounds in the process of the present invention.

Examples of suitable compounds which may be reacted together to form the copolyesters of the present invention are ε-caprolactone with terephthalic acid and ethylene glycol, ε-caprolactone with dimethyl terephthalate and ethylene glycol, ε-caprolactone with bis(β-hydroxyethyl) terephthalate, ε-caprolactone with poly(ethylene terephthalate), poly-ε-caprolactone with terephthalic acid and ethylene glycol, poly-ε-caprolactone with dimethyl terephthalate and ethylene glycol, poly-ε-caprolactone with bis(β-hydroxyethyl) terephthalate, poly-ε-caprolactone with poly(ethylene terephthalate) and 6-hydroxycaproic acid, its acyl derivatives or esters of the acid or its acyl derivatives with poly(ethylene terephthalate) or its precursors. The preferred precursors for the preparation of our copolyesters are ε-caprolactone, dimethyl terephthalate and ethylene glycol.

It is preferred to react the copolymer precursors in the presence of a catalyst. The particular variety of catalyst most suitable in any given case will depend on the nature of the reaction taking place. Where the terephthalate-generating compounds are, for example, dimethyl terephthalate and ethylene glycol, or bis(β-hydroxyethyl) terephthalate, the initial reaction is an ester-interchange, or ester alcoholysis, reaction. In such cases, it is preferred to use those catalysts known in the art as ester-interchange catalysts including, for example, zinc borate, litharge, calcium acetate and manganese acetate. Mixtures of such catalysts may be used if desired. Where the terephthalate-generating compounds are, for example, terephthalic acid and ethylene glycol, the initial reaction is a direct esterification reaction. In such cases it is preferred to use an acid esterification catalyst, for example o-phosphoric acid or p-toluene sulphonic acid. Where the terephthalate-generating compound is, for example, poly(ethylene terephthalate), no ester-interchange or esterification reaction takes place, and in such cases it is preferred to use a polymerization catalyst, for example antimony trioxide. Such a polymerization catalyst may also be advantageously used to aid the polymerization in those cases where an ester-interchange or direct esterification reaction also takes place. In such cases it is preferred to add the polymerisation catalyst when the ester-interchange or esterification reactions are substantially complete. A number of ester-interchange and polymerisation catalysts will be found listed in the paper by R. E. Wilfong, J. Polymer Sci. (1960), 54, 385. It will be appreciated that any particular catalyst may catalyse, to varying degrees, more than one of the above types of reaction and thus a certain amount of latitude may be exercised in the choice of catalyst for a particular reaction.

The process is preferably effected at a temperature sufficient to melt any solid precursors, and more preferably at a temperature in the range 180° C. to 300° C. At tempeatures below 180° C. the process may become uneconomically slow, and at temperatures in excess of 300° C. undersirable side reactions and degradation may tend to occur.

The pressure at which the process is operated is not critical and it has been found convenient to conduct at least part of the process at atmospheric pressure. However, where the reaction mixture contains an excess of a volatile precursor, for example ethylene glycol, or the reaction results in the production of volatile condensation products, for example methanol or water, it may be found advantageous to complete the reaction under reduced pressure to assist the removal of such volatile materials.

The reaction is preferably effected in the absence of air, which may be found to cause some degradation and undesirable colouring of the products, and, if desired, may be effected under a constant flow of an inert gas, that is a gas which does not interfere with the polymerisation reaction, for example nitrogen, which may conveniently, particularly towards the end of the reaction, be passed through the reaction mixture to stir the mixture and aid the removal of any volatile reaction products.

The reaction may conveniently be effected in two stages, the first stage being to drive off any initial volatile condensation products where the process involves an ester-interchange or direct esterification reaction, and/or to obtain a homogeneous melt, and the second stage, generally effected at a higher temperature than the first stage, being to continue the copolymerisation to the desired degree of conversion.

The time required for the reaction to reach the desired degree of conversion, as determined by measurement of the reduced viscosity (as hereinafter defined) of the product, will depend on several factors including the proportions of initial reactants, the reaction temperature, the catalyst used and the degree of conversion desired. In general, reaction times in the range 2 to 50 hours have been found sufficient.

Where the terephthalate-generating compounds are ethylene glycol and either terephthalic acid or an ester of terephthalic acid, it is preferred that the ratio of molar proportions of ethylene glycol to terephthalic acids or terephthalic acid ester be in excess of 1:1, and more preferably in excess of 2:1. Molar ratios of ethylene glycol to terephthalic acid or the terephthalic acid ester in the range 2.2:1 to 2.7:1 are most suitable. Also it has been found that where the ester-generating compound is relatively volatile at the reaction temperature, for example where ε-caprolactone is used, some loss thereof may be found to occur during the reaction, and molar proportions slightly in excess of those required in the product may have to be used in such circumstances.

According to our preferred process, ε-carprolactone, dimethyl terephthalate and ethylene glycol are reacted in the presence of a catalyst as hereinbefore defined. The reaction is preferably effected in two stages, the first stage, during which methanol is evolved and a homogeneous melt is obtained, being effected at a temperature usually in the range 180° C. to 240° C., and preferably 180° C. to 220° C., and the second stage, during which the polymerisation is carried to the desired degree of conversion, being effected at a temperature usually in the range 240° C. to 280° C., and preferably 250° C. to 275° C. The first stage of the reaction is generally effected at atmospheric pressure and under an atmosphere of nitrogen, and the second stage is generally effected with stirring under a stream of nitrogen which is advantageously passed through the melt to stir it and assist the displacement of any volatile reaction products, and it has been found convenient to effect the last part of this stage under reduced pressure to aid the removal of any volatile reaction products or any volatile, unreacted starting materials.

The products of our process may, if necessary, be isolated by conventional methods.

As an alternative process the said ester-generaitng compound and the said terephthalate-generating compound or compounds may be reacted together in solution in a solvent which is a solvent for all the said starting materials and preferably also for the copolyester products. Suitable solvents are generally high-boiling organic solvents, for example high-boiling hydrocarbons, aromatic ethers and nitrobenzene. The products of such a process may either be retained in solution for use in solvent based applications, or precipitated from solution for example by pouring the solution into a non-solvent for the copolyester product.

The properties of the copolyesters according to our invention vary according to the relative proportions of 6-oxycaproyl units to ethylene dioxy and terephthaloyl units in the macromolecular chains. Where the molar ratios of terephthaloyl units to 6-oxycaproyl units are in excess of about 45:55 the products range from rubbery materials which crystallise slowly from the melt to products which crystallise readily from the melt as the proportions of terephthaloyl units in the macromolecular chains increase, those products having molar ratios of terephthaloyl units to 6-oxycaproyl units of about 60:40 or above generally being readily crystallisable. Where the molar ratios of terephthaloyl units to 6-oxycaproyl units are about 45:55 or below, the products are essentially amorphous, tending to highly viscous liquids as the proportions of terephthaloyl units decrease within our specified range. Also, in general, as the proportions of terephthaloyl units in the macromolecular chains increase, the softening or melting points of our copolyesters increase. Those products having an excess of 6-oxycaproyl units outside our specified range tend to be viscous liquids unsuitable for coating or adhesive applications, while those products having an excess of terephthaloyl units outside our specified range tend to have softening temperatures too high to be of value as melt adhesives or coating materials. For adhesive, coating or other applications it is preferred to use those copolyesters having a molar ratio of terephthaloyl units to 6-oxycaproyl units of 45:55 or above within our specified range. Those copolyesters having molar ratios of terephthaloyl units to 6-oxycaproyl below 45:55 tend to have softening points rather low for some applications, although such copolyesters, and particularly those approaching the lower limit of our specified range may find particular use as, for example, pressure-sensitive adhesives for example in the preparation of pressure-sensitive adhesive tape.

Where the molar ratios of terephthaloyl units to 6-oxycaproyl units in our copolyesters are below about 65:35 within our specified range, the products are soluble in a variety of organic solvents including, for example, chloroform, methylene chloride and mixtures of trichloroethylene and methylene chloride. Such solutions may advantageously be used in solvent-based applications of the copolyesters.

For adhesive, coating or other applications, it is preferred that the copolyesters of our invention have reduced viscosities, measured on 0.5 gm. decilitre$^{-1}$ solutions in o-chlorophenol at 25° C., in the range 0.3 to 2.0 decilitres gm.$^{-1}$. By reduced viscosity we mean the value obtained for $$\frac{t-t_o}{t_o c}$$

where $t$ is the flow time of a solution of the polymer at a concentration of "$c$" gms. per decilitre of solvent through a viscometer, and $t_o$ is the flow time of the same volume of pure solvent through the same viscometer under the same conditions. At reduced viscosities less than 0.3 decilitre gm.$^{-1}$ the copolyesters of our invention are not generally found to have properties making them of use as solution or melt adhesives or as coating materials. However, so long as the reduced viscosities are at least 0.15 decilitres gm.$^{-1}$ it has been found that such copolyesters, and particularly those having a high proportion of 6-oxycaproyl units in the macromolecular chains, may find application as the adhesive moiety of pressure-sensitive tapes. For the majority of applications, those copolyesters having reduced viscosities in the range 0.5 to 1.0 decilitres gm.$^{-1}$ have been found to be most suitable.

Where poly(ethylene terephthalate) is used as one of the precursors in our copolymerisation process, the resulting copolyesters may be in the form of block copolymers. By block copolymers in this context we mean copolymers the macromolecular chains of which contain chains of poly(ethylene terephthalate) units, that is units of the structure IV below:

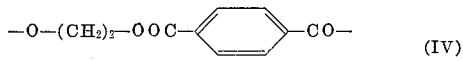

(IV)

coupled with chains of 6-oxycaproyl units, rather than a more random arrangement of 6-oxycaproyl, ethylene dioxy and terephthaloyl units in the macromolecular chains. The formation of such block copolymers depends on the reaction conditions. In general, the longer the reaction time, the higher the temperature and/or the more effective the catalyst, the greater is the tendency for the randomisation of these copolymers. The physical properties of such block copolymers vary, to some degree, from those of the more random copolymers, in particular in having higher melting or softening points, slightly higher degrees of crystallinity and lower solubilities. Thus such a block structure may be of particular advantage in increasing the melting or softening points of those of our copolyesters having high proportions of 6-oxycaproyl units in the macromolecular chains.

The terephthaloyl units in the copolyester macromolecular chains may, if desired, be replaced by small amounts of units of the structure V below:

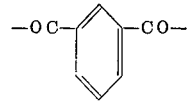

(V)

hereinafter referred to as isophthaloyl units, without substantial changes in the properties of the products. Also, if desired, larger proportions, and even up to 50% of the terephthaloyl units may be replaced by isophthaloyl units.

The incorporation of isophthaloyl units into the macromolecular chains has the effect of lowering the crystallinity, lowering the softening or melting points, and slightly increasing the solubility of the copolyesters, such effects generally increasing as the proportions of isophthaloyl units increase. Thus such isophthaloyl-modified copolyesters may be used to particular advantage in applications where copolyesters of low crystallinity are desired, for example where transparent bonds or coatings are required.

Isophthaloyl units may be incorporated into the macromolecular chains of our copolyesters by including in the polymerisation reaction mixture the desired proportions of isophthalate compounds, hereinafter referred to as the isophthalate-generating compound or compounds, equivalent to any of the terephthalate compounds which may be used in the preparation of our copolyesters. The preferred reaction conditions for processes involving the use of isophthalate-generating compounds are the same as those described above for processes involving only ester-generating and terephthalate-generating compounds. It will be appreciated that, by choice of process to include, as polymer precursors poly(ethylene terephthalate) and poly(ethylene isophthalate), terpolymers having a block structure may be obtained.

If desired, in the preparation of our copolyesters, a branching or cross-linking agent may be incorporated into the reaction mixture. Suitable branching or cross-linking agents are reactive tri- or higher polyfunctional compounds and include, for example trihydric or higher polyhydric alcohols, for example pentaethrythritol, tribasic or higher polybasic acids or suitably reactive polyfunctional derivatives thereof, for example pyromellitic dianhydride, and tri- or higher polyisocyanates. Such a branching or cross-linking agent may be present in small quantities to give products having reduced degrees of crystallinity, reduced solubility and increased softening or melting points. The incorporation of such an agent in the reaction mixture also causes a reduction in the reaction time required to give copolyesters of a required viscosity. Such branching or cross-linking agents may be present in amounts up to about 7% by weight of the total reactants, although it may be found that if too large amounts of cross-linking agent are included, the melting or softening points become excessively high, or the copolyesters degenerate before a softening or melting point is reached.

The addition of such branching or cross-linking agents may be found to be of great advantage where copolyesters of low-crystallinity are desired, for example where transparent bonds or coatings are required, where copolyesters having a high temperature resistance are required, to increase the softening or melting points of those copolyesters having a high proportion of 6-oxycaproyl units in the macromolecular chains or to increase the chemical resistance of our copolyesters.

Also, if desired, the reaction mixture may contain other reactive or non-reactive materials, for example mono-functional materials, for example monohydric alcohols or monobasic acids, as molecular weight regulators, di-functional materials, in amounts up to about 10% by weight of the total reactants, for example dihydric alcohols, dibasic acids or diisocyanates, as chain linking and molecular weight increasing agents, or colour stabilisers such as, for example, triphenyl phosphite. In adhesive applications, in particular, it may be found of advantage to blend our copolyesters, in particular those having a high reduced viscosity, with resinous materials to lower the melt viscosities of the copolyesters and hence render them more readily applicable to the adherends. Such advantages may also be found in coating or other applications. In general as the proportions of resin to copolyester increase the viscosities of the resultant blends decrease. However, it may be found that if too much resin is added an excessive loss in the cohesive strength of the blend may occur. Suitable resinous materials for use in the blends include, for example rosin esters, for example "Staybelite Ester 10" (registered trademark), and terpene resins. Also, for most applications, and especially coating applications it may be found advantageous to blend the copolyesters of our invention with other polymeric materials to improve the adhesive and impact-resistance properties of such materials. It has been found of particular advantage to blend the copolyesters of our invention with poly(methyl methacrylate), improving the adhesive properties, the impact-resistance and the ultra-violet stability of that polymer for use in coating applications.

Also, before use, modifying agents such as pigments, fillers, delustrants, heat and light stabilisers, anti-oxidants, mould-release agents, fire retardants, plasticisers and other such additives known in the art may be dispersed throughout our copolyesters. By modifying agents, in general, we mean materials which, when dispersed through the copolymers cause some change in the appearance of the polymers, in the ease with which they can be used or worked or in the stability of the copolymers to the conditions of working or use.

The copolyesters of our invention have been found to be surprisingly useful as adhesives.

Thus, according to a further embodiment of our invention we provide a process for bonding together two surfaces which comprises interposing between the two surfaces one or more layers of an adhesive in the form of a solution, a dispersion, a solid, a liquid or a melt and applying such pressure and heat as is required to form good contact between the adhesive and the adherends, the said adhesive comprising the copolyesters according to the present invention optionally in admixture with other resinous or polymeric materials.

The copolyesters may be applied to the surfaces to be bonded in any convenient form, according to the particular items being bonded, the copolyester being used and the circumstances under which it is to be bonded. The temperature and pressure required to form the bond will depend largely on the form in which the copolyester is applied to the surface, and the nature of the surface to which it is applied. Thus a solid layer of copolyester interposed between the two surfaces will require more heat and pressure than, for example, a layer of the molten copolyester, or a layer of copolyester solution, for example in chloroform or methylene chloride, or dispersion, for example in petroleum ether.

A wide range of adherends may be bonded using our copolyesters and examples of such adherends include glass, metals, for example aluminium and mild steel, polymeric materials, for example plasticised or unplasticised poly (vinyl-chloride), polyester, especially poly(ethylene terephthalate), films, cellophane and a variety of elastomers, paper, fabrics, and a variety of natural products, for example wood and leather. It will be appreciated that the two surfaces being bonded together may, if desired, belong to different types of adherend.

It may be found advantageous, depending on the strength of bond required and the natures of the surfaces being bonded, to subject the adherends to one or more surface treatments known in the art, for example for removing regions of low strength from the surfaces. Such treatments include, for example, degreasing the surface and abrading the surface.

Those copolyesters of our invention having a high proportion of 6-oxycaproyl units in the macromolecular chains tend to be flexible and are particularly suitable for bonding flexible adherends, for example plasticised poly (vinyl chloride) and polyester films. Those having a high proportion of terephthaloyl units in the macromolecular chain tend to have high cohesive strengths and are particularly suitable for bonding rigid adherends, for example glass, aluminium and wood.

For adhesive applications, in general, it is preferred to use those copolyesters of our invention having molar ratios of terephthaloyl units to 6-oxycaproyl units in the macromolecular chains in the range 45:55 to 65:35. Below the ratio 45:55 the copolyesters tend to have melting or softening points rather low for some applications, although, as has already been stated, such copolyesters may find particular application as pressure-sensitive adhesives. Above the ratio 65:35 the copolyesters tend to have melting or softening points rather high for convenient use in some applications, although it will be appreciated that where rigid adherends are being bonded it is generally preferred to use as high proportions of terephthaloyl units, within our specified range, as is conveniently possible.

It will also be appreciated that the above preferred range may be changed by one or more of the hereinbefore described modifications to our copolyesters. For example, the softening or melting points of those copolyesters having molar ratios of terephthaloyl units to 6-oxycaproyl units in the macromolecular chains below 45:55 may be increased by the use of block copolymers, as hereinbefore described, or by the incorporation in the polymerisation reaction mixture of a branching or cross-linking agent, as hereinbefore described. On the other hand, those copolyesters having molar ratios of terephthaloyl units to 6-oxycapropyl units in the macromolecular chains in excess of 65:35 may have their melting or softening points lowered by the incorporation into the macromolecular chains of isophthaloyl units, as hereinbefore described, or by blending the copolyesters with other resinous material as hereinbefore described.

Where particular properties are required of the bonds, the molar ratios of terephthaloyl units to 6-oxycaproyl units in the copolyester macromolecular chains and the modifications to the copolyesters may be adjusted accordingly. For example, where a transparent bond is required, it is preferred to use those of our copolyesters having low degrees of crystallinity. Such low degrees of crystallinity may be obtained (a) by using copolyesters having high proportions of 6-oxycaproyl units in the macromolecular chains, (b) by introducing a branching or cross-linking agent into the copolymerisation reaction mixture and/or (c) by incorporating isophthaloyl units into the macromolecular chains. Where the adhesive is required to have resistance to high temperatures, it is preferred to use those of our copolyesters having high melting or softening points. Such high melting or softening points may be obtained (a) by using copolyesters having high proportions of terephthaloyl units in the macromolecular chains (b) by using copolyesters having a block structure and/or (c) by introducing branching or cross-linking agents into the copolymerisation reaction mixture. Such copolyesters are also preferred where the adhesive is required to have a high resistance to chemical attack.

It may be found that, for a particular copolyester used to bond a particular pair of adherends, best bonding results are obtained over a particular range of values of reduced viscosity for the copolyesters. Such optimum ranges may be found, for any particular case, by simple experiment.

The copolyesters of our invention have been found to be of special utility in the bonding of poly(ethylene terephthalate) film. Outstanding results have been found when using those of our copolyesters having molar ratios of terephthaloyl units to 6-oxycaproyl units in the macromolecular chains in the range 45:55 to 60:40. When bonding poly(ethylene terephthalate) film using a copolyester containing approximately equal proportions of terephthaloyl units and 6-oxycaproyl units, best bonding results have been found to occur where the reduced viscosity of the copolyester falls in the range 0.6 to 0.8 decilitre gm.$^{-1}$, measured on a 0.5 gm. decilitre $^{-1}$ solution in o-chlorophenol at 25° C.

Particular adhesive applications for the copolyesters of our invention include, for example, bonding shoe materials, covering books, the manufacture of laminates, for example glass laminates for safety glass, the application of veneers and packaging. By way of example, packages for food or other products may be produced by a procedure such as that described below. The packaging material, for example poly(ethyleneterephthalate) film or cellophane, is coated with a solution of the copolyester, the package is formed and is subsequently sealed using, for example, a heated roller. Also, for example, plastic tubes may be formed from, for example, poly(ethyleneterephthalate) film, by helically winding a strip of the film and applying the copolyester, for example in the form of a melt, to bond each consecutive winding to the previous winding.

The copolyesters according to the present invention also show surprising utility as coating materials to give protective coatings to a wide range of substrates.

Thus according to a further embodiment of the present invention we provide a method for protecting a substrate which comprises applying to the surface of the substrate one or more layers of a coating material comprising a copolyester according to the present invention optionally in admixture with other resinous or polymeric materials.

Substrates which may be coated using the copolyesters of our invention include, for example, glass, metals, for example aluminum, copper and mild steel, polymeric materials, for example plasticised or unplasticised poly(vinyl chloride) and polyester films, particularly poly(ethylene terephthalate) film, paper, textile materials and a wide range of natural materials, for example wood, leather and natural fibres, for example cotton and wool. The substrate to be coated may be in any solid shape or form and may be, for example, in the form of sheets, wires, tubes, blocks, shaped articles, particles, films and fibres. The substrate surface may, if desired, be subjected to a surface treatment such as has been discussed hereinbefore with relation to adhesive applications.

The copolyester coatings may be applied in any convenient form. For example the coatings, where soluble, may be applied from solution in, for example, methylene chloride, chloroform or a mixture of trichloroethylene and methylene chloride. Alternatively, the coatings may be applied from dispersion in, for example, petroleum ether, or by melt techniques, for example flame spraying or melt extrusion. The particular technique used will depend on the particular application.

The copolyesters most suitable for use in coating applications are the same as those most suitable for use in adhesive applications, and the statements made above in relation to adhesive applications with regard to those polymers most suitable for bonding flexible and rigid adherends, the preferred range of molar ratios of terephthaloyl units to 6-oxycaproyl units, the effects of modifications on that range, those copolyesters most suitable for applications requiring transparent bonds and those copolyesters most suitable for resisting high temperature and chemical attack apply equally to coating applications except that the distinction between copolyesters most suitable for bonding flexible adherends and those most suitable for bonding rigid adherends is not so great in coating applications as in adhesive applications. In addition it has been found that as the proportions of 6-oxycaproyl units in the macromolecular chains increase, the impact resistance of coatings from the copolyesters increases. Thus, where it is desired to prepare coatings having a high impact resistance it is preferred to use those copolyesters having a high proportion of 6-oxycaproyl units in the macromolecular chains.

The coatings prepared according to this embodiment of our invention are generally tough and flexible, particularly up to a molar ratio of terephthaloyl units to 6-oxycaproyl units of 70:30, but may be brittle where proportions of terephthaloyl units to 6-oxycaproyl units exceed this value unless high molecular weight products are used. In addition, the coatings show good resistance to water, salt water, temperature, high relative humidities, ultraviolet radiation and atmospheric conditions. The coatings also show good resistance to a wide range of common chemicals, are stain resistant, maintain good adhesion to the substrates, in some cases even when the substrates have not been surface treated prior to coating, show a good gloss, whether pigmented or not, and have a high impact resistance. Where two coated surfaces are brought together, the two surfaces may be bonded together by the application of heat and pressure. It will be apparent from the above discussion that the copolyesters of our invention provide a wide range of useful coating materials.

Among the many coating applications for which our copolyesters are suitable, the following may be mentioned by way of example: the coating of metals to protect them from corrosion, for example for marine or aviation applications; the insulation of wire for use in low voltage applications; the coating of wood for protection from atmospheric conditions in exterior use; the coating of paper to give resistance to water, stains and tearing, for example the washable, stain-resistant wallpaper and for paper clothing which may be water proof, stain-resistant and tear-resistant, the seams being conveniently heat-sealed; the coating of plastics to protect against ultra-violet radiation; the coating of fibres and woven or non-woven fabrics to give waterproof articles, for example rainwear, umbrellas and tents; and in packaging as described earlier.

Our copolyesters have been found to have particular utility in the coating of poly(ethylene terephthalate) film, and the statements above regarding their use as adhesives with poly(ethylene terephthalate) film apply equally to the coating thereof.

The use of the copolyesters of the present invention is not restricted to adhesive and coating applications. Other applications include use as plasticizers and in the preparation of shaped articles. By shaped articles we mean the products of any process which imparts a specific shape or form to the copolyesters, and examples of such shaped articles include films, fibres and moulded articles. For the preparation of shaped articles it is preferred to use those of our copolyesters having molar ratios of terephthaloyl units to 6-oxycaproyl units of at least 55:45 within our specified range, as those of our copolyesters having ratios below 55:45 tend to have rather low softening or melting points for convenience, and the shaped articles therefrom tend to be lacking in dimensional stability.

The invention is illustrated, but in no way limited, by the following examples in which all proportions are in parts by weight unless otherwise indicated.

The reaction vessel used for the copolyester preparation in each of the following examples comprised a glass vessel fitted with a sealable inlet tube, an outlet tube and a means for passing nitrogen through the reaction mixture.

In the examples, the adhesion tests quoted were conducted in the following manner, unless otherwise indicated. The adhesive joints were made by heating the copolyesters between the adherends in a press at a pressure of 50 p.s.i. for 5 minutes at a temperature such that the viscosities of the copolyesters were low enough to form good contact with the adherends. The bonding may be carried out using lower pressures for very much shorter periods if desired. The adhesive joints were allowed to cool to room temperature under slight pressure, and tested 24 hours later. The shear strengths of the lap joints were determined using a Hounsfield Tensometer (type W) at a withdrawal rate of 0.25 inch per minute. In the case of the peel tests the general procedure suggested in ASTM D–1876–61T (T peel test) was adopted except that a withdrawal rate of 4.5 inches per minute was used.

The surface treatments used for the various adherends are given below:

| | |
|---|---|
| Aluminium | Solvent degreased and abraded. |
| Mild Steel | |
| Glass | Solvent degreased. |
| "Neolite"* (a rubber used in the shoe industry). | Abraded. |
| "Vynide"* (plasticised poly (vinyl chloride). | |
| Black soling compound | |
| Gristle rubber | |
| "Melinex"* (poly(ethylene terephthalate) film). | No surface treatment. |
| Beechwood | |

* Registered trademarks.

In the examples, the coatings were applied by dipping the substrate into a solution of the copolyester, unless otherwise indicated.

EXAMPLE 1

ε-Caprolactone (567 parts), dimethyl terephthalate (747 parts) and ethylene glycol (567 parts) were mixed in a reaction vessel, and zinc borate (0.07 part) and litharge (0.07 part) were added as catalysts.

The reaction mixture was heated under nitrogen at 200° C. to obtain a homogeneous melt, and maintained at this temperature for 1½ hours, during which time methanol was evolved. At the end of this time the evolution of methanol ceased and the temperature was increased to 250–260° C. A rapid nitrogen flow was established through the melt to aid the removal of volatile reaction products. The reaction mixture was maintained under these conditions for a further 1¼ hours. At the end of this time, the pressure was reduced over a period of 2 hours to 0.05 mm. Hg and the reaction continued for a further 16 hours before being discontinued.

The product on cooling was a light grey rubbery material of stick temperature (adhesion to a Kofler bar) of about 125° C. The product had a reduced viscosity, measured on a 0.5 gm./100 cc. solution in o-chlorophenol at 25° C., of 0.81 decilitre gm.$^{-1}$. The product was soluble in chloroform. A film, solvent cast from chloroform, showed a low degree of crystallinity to X-rays and observation through a polarising microscope showed a melting point of 145° C.

A sample of the product weighing 1.98 grams was hydrolysed in a boiling 20% by weight aqueous solution of potassium hydroxide to give a homogeneous solution. After cooling and subsequent acidification, terephthalic acid was precipitated, filtered off, washed and dried to a constant weight of 1.09 gms. This corresponded to molar ratio of terephthaloyl units to 6-oxycaproyl units in the copolyester of 50.8:49.2.

The following results were obtained in adhesion tests on the copolyester:

| Adherends: | Peel strength (lbs. in.$^{-1}$) |
|---|---|
| Neolite [1]:leather | 23 |
| Melinex [1]:Melinex [1] | 27 |
| Gristle rubber:gristle rubber | 24 |
| Vynide [1]:Vynide [1] | 26 |

[1] Registered trademark.

EXAMPLE 2

ε-Caprolactone (100 parts), dimethyl terephthalate (57.9 parts) and ethylene glycol (39.9 parts) were mixed in a reaction vessel, and zinc borate (0.007 part) and litharge (0.007 part) were added as catalysts. Essentially the same procedure was followed as described in Example 1.

On cooling to room temperature, a light grey highly viscous liquid was produced which adhered to a Kofler bar at about 48° C. The product had a reduced viscosity, measured on a 0.5 gm./100 cc. solution in o-chlorophenol at 25° C. of 1.04 decilitre gm.$^{-1}$.

A sample of the product weighing 5.02 gms. was hydrolysed following the procedure described in Example 1 to give 1.88 gms. of terephthalic acid. This corresponded to molar ratio of terephthaloyl units to 6-oxycaproyl units in the copolyester of 31.2:68.8.

The peel strengths observed in adhesion tests for the copolyester with Vynide:Vynide and Melinex:Melinex were both about 5 lbs. in.$^{-1}$. The softening point of the product was rather low for some applications, but the copolyester showed potential as a pressure-sensitive adhesive.

EXAMPLE 3

ε-Caprolactone (324 parts), dimethyl terephthalate (474 parts), ethylene glycol (333 parts) and pentaerythritol (8 parts) were mixed in a reaction vessel. Zinc borate (0.20 part) and litharge (0.20 part) were added as catalysts.

The reaction mixture was heated at 190° C. for 1½ hours under an atmosphere of nitrogen, during which time a homogeneous melt was obtained, and methanol was evolved. At the end of this time, the evolution of methanol ceased, and the temperature was increased to 240° C., a rapid nitrogen flow being established through the melt to aid the displacement of volatile reaction products. These conditions were maintained for 50 minutes, after which time the pressure was reduced over a period of 2 hours to 0.05 mm. Hg. The reaction was discontinued after 1 hour at the reduced pressure.

On cooling, a light grey rubbery material was produced, which adhered to a Kofler bar at 75° C. The product had a reduced viscosity, measured on a 0.5 gm./100 cc. solution in o-chlorophenol at 25° C. of 0.94 decilitre gm.$^{-1}$. By analogy with other copolyester preparations, this copolyester had a molar ratio of terephthaloyl units to 6-oxycaproyl units of approximately 51:49.

The copolyester was soluble in chloroform, and crystallised only after standing for a long period of time.

The following results were obtained from adhesion tests carried out on the copolyester:

| Adherends: | Peel strength (lbs. in.$^{-1}$) |
|---|---|
| Melinex:Melinex | 20 |
| Vynide:Vynide | 18 |
| Gristle rubber:gristle rubber | 20 |
| Black soling compound:black soling compound | 23 |

EXAMPLE 4

ε-Caprolactone (182 parts), ethylene glycol (472 parts) and dimethyl terephthalate (620 parts) were mixed in a reaction vessel. Zinc borate (0.20 part) and litharge (0.20 part) were added as catalysts and the reaction mixture was heated under nitrogen for one hour at 200° C. A homogeneous melt was obtained and subsequent methanol evolution was completed during this period. The temperature was then increased to 250° C. and the nitrogen flow was increased through the melt to aid in the displacement of volatile reaction products. These conditions were maintained for a further 1¼ hours, after which time the pressure was reduced over a period of 30 minutes to 0.05 mm. Hg. The reaction was discontinued after 17 hours at reduced pressure.

On cooling to room temperature, a white, highly crystalline material was produced, melting over the range 192 to 198° C. The product had a reduced viscosity, measured on a 0.5 gm./100 cc. solution in o-chlorophenol, of 0.57 decilitre gm.$^{-1}$.

The molar ratio of terephthaloyl units to 6-oxycaproyl units in the copolyester, as determined by hydrolysing a sample to terephthalic acid as described in Example 1, was 76:24.

The product showed good adhesion to a number of adherends, being particularly useful for use with rigid adherends. The breaking stress of aluminium:aluminium lap joints was 950 lbs. in.$^{-2}$ and that of glass:glass was 700 lbs. in.$^{-2}$.

EXAMPLE 5

ε-Caprolactone (243 parts), ethylene glycol (472 parts), and dimethyl terephthalate (620 parts) were mixed in a reaction vessel. Zinc borate (0.20 part) and litharge (0.20 part) were added as catalysts and the reaction mixture was heated under nitrogen to 200° C. The reaction mixture was maintained at this temperature for 1½ hours, during which period a homogeneous melt was obtained, and methanol was evolved. The reaction temperature was then increased to 270° C. and a rapid nitrogen flow established through the melt to aid the displacement of volatile reaction products. After 45 minutes the pressure was reduced over a period of 30 minutes to 0.2 mm. Hg and the temperature lowered to 240° C. After a further 16 hours under these conditions the reaction was discontinued.

On cooling a light, translucent, tough, rubbery material was produced which crystallised on standing. The crystalline material melted over the range 152–156° C., and had a reduced viscosity, measured on a 0.5 gm./100 cc. solution in o-chlorophenol at 25° C. of 0.51 deciliter gm.$^{-1}$. The product was readily soluble in chloroform.

The molar ratio of terephthaloyl units to 6-oxycaproyl units in the copolyester, as determined by hydrolysing a sample to terephthalic acid as described in Example 1, was 62.9:37.1.

The following results were obtained from adhesion tests on the copolyester:

| Adherends: | Breaking stress (lbs. in.$^{-2}$) |
|---|---|
| Beechwood:beechwood | 1050 |
| Aluminium:aluminium | 1000 |
| Glass:glass | 750 |
| Mild steel:mild steel | 700 |

The high breaking stress of the glass:glass bond indicates that this copolyester has potential use in the formation of glass laminates, for example, for the manufacture of shatter-proof glass.

The copolyester also showed potential as a solvent based adhesive. A chloroform solution containing 10% by weight of the copolyester, and 2% by weight of "Staybelite Ester 10" (registered trademark) was used to bond beechwood to beechwood. Two coatings were applied, and the wood strips were clamped after most of the chloroform in the second coating had evaporated but before the adhesive had lost its tack. Breaking stresses of 350 lbs. in.$^{-2}$ were observed.

EXAMPLE 6

ε-Caprolactone (81 parts) and bis(β-hydroxyethyl) terephthalate (476 parts) were mixed in a reaction vessel. Antimony trioxide (0.06 part) and calcium acetate (0.25 part) were added as catalysts, and the reaction mixture was heated to 190–200° C. under nitrogen, for one hour. A homogeneous melt was obtained under these conditions. The temperature was then increased to 220–240° C. over a period of 1¾ hours, and the displacement of volatile reaction products from the melt was aided by means of a rapid nitrogen flow. The reaction was discontinued after a further 24 hours under these conditions at 240° C.

On cooling to room temperature, a tough, grey, rubbery material was produced, which adhered to a Kofler bar at about 125–128° C. The product was soluble in chloroform, from which a tough, solvent-cast film was obtained.

By analogy with other copolyester preparations, the molar ratio of terephthaloyl units to 6-oxycaproyl units in this copolyester were approximately 56:44.

The product had a reduced viscosity, measured on a 0.5 gm./100 cc. solution in o-chlorophenol at 25° C. of 1.10 decilitre gm.$^{-1}$.

When this copolymer was used as an adhesive essentially similar results to those quoted in Example 4 were obtained.

EXAMPLE 7

ε-Caprolactone (107 parts) and bis(β-hydroxyethyl) terephthalate (476 parts) were mixed in a reaction vessel. Zinc borate (0.04 part) and litharge (0.04 part) were added as catalysts and the mixture was heated under nitrogen for 30 minutes at 200° C. to give a homogeneous melt. The temperature was then increased to 270° C. and a rapid flow of nitrogen was established to assist the removal of volatile reaction products from the melt. After 4 hours under these conditions, the temperature was maintained and a vacuum of 0.05–0.2 mm. Hg obtained by reducing the pressure and the rate of nitrogen passing through the reaction mixture. The reaction was discontinued after an additional 1½ hours under these conditions.

At room temperature the product was a white crystalline material melting over the range 187–189° C. The reduced viscosity of a 0.5 gm./100 ccc. solution in o-chlorophenol was 0.55 decilitre gm.$^{-1}$ at 25° C.

By analogy with other copolyester preparations, this copolyester had a molar ratio of terephthaloyl units to 6-oxycaproyl units of approximately 73:27.

When this copolymer was used as an adhesive essentially similar results to those quoted in Example 4 were obtained.

EXAMPLE 8

ε-Caprolactone (380 parts), terephthalic acid (553 parts) and ethylene glycol (512 parts) were mixed in a reaction vessel and o-phosphoric acid (1.5 parts) was added as a catalyst. The reaction mixture was heated at 200° C. under nitrogen for 21½ hours to obtain a homogeneous melt. During this period water was evolved.

After the addition of antimony trioxide (0.38 part), the temperature was increased to 265° C. and nitrogen was passed rapidly through the reaction mixture. These conditions were maintained for 3¼ hours. The pressure and the nitrogen flow were then reduced to obtain a vacuum of 0.05–0.2 mm. Hg. After a further 2¼ hours the reaction was discontinued.

On cooling to room temperature the product was a translucent slightly yellow elastomeric material. On standing overnight crystallisation occurred and the resulting copolyester melted at about 123° C. The reduced viscosity of a 0.5 gm./100 cc. solution in o-chlorophenol was 0.54 decilitre gm.$^{-1}$ at 25° C.

A sample of the copolyester weighing 1.006 grams was dissolved in 20 mls. of dioxane and hydrolysed for 15–30 minutes on a water bath by the addition of 5 mls. of aqueous 5 N potassium hydroxide solution. After the first 10 minutes of this reaction, 5 mls. of distilled water were added. This did not precipitate the polymer but appeared to accelerate the hydrolysis as evidenced by the rapid precipitation of disodium terephthalate. Further distilled water (100–300 mls.) was added at this stage to dissolve the disodium terephthalate. Hydrochloric acid (a 50:50 mixture of the concentrated acid and water, by volume) was then added dropwise whilst stirring until the mixture attained a pH value of 2. The precipitated terephthalic acid was then filtered, washed with water and dried to a constant weight of 0.583 gram in a vacuum oven at 80° C. This corresponded to molar ratio of terephthaloyl units to 6-oxycaproyl units in the copolyester macromolecular chains of 55.1:44.9.

When the product was used as an adhesive an average peel strength of 15 lbs. in.$^{-1}$ was observed for Melinex:Melinex (registered trademark) bonds and the average breaking stress of aluminum:aluminium lap joints was 320 lbs. in.$^{-2}$.

EXAMPLE 9

Poly-ε-caprolactone (80 parts), terephthalic acid (116 parts) and ethylene glycol (95.5 parts) were mixed in a reaction vessel and o-phosphoric acid (1.5 parts) was added as catalyst. This reaction mixture was flushed out with nitrogen and then heated at 200 to 210° C. for 24 hours. During this period water was evolved and a homogeneous melt was obtained.

Antimony trioxide (0.38 part) was added at this stage. The temperature was then increased to 240° C. and a rapid nitrogen flow was passed through the melt. After 2¼ hours under these conditions the temperature was increased further to 265° C. Three hours later the reaction was discontinued.

On cooling to room temperature the product was an off-white crystalline solid which melted over the range 141 to 147° C. The reduced viscosity of a 0.5 gm./100 cc. solution in o-chlorophenol was 0.66 decilitre gm.$^{-1}$ at 25° C. Hydrolysis experiments using the procedure described in Example 8 indicated that the molar ratio of terephthaloyl units to 6-oxycaproyl units was 58.7:41.3 in this copolyester.

When the product was tested as an adhesive for Melinex:Melinex (registered trademark) adherends, peel strengths of approximately 18 lbs. in.$^{-1}$ were observed.

EXAMPLE 10

Poly-ε-caprolactone (190 parts), dimethyl terephthalate (326 parts), ethylene glycol (256 parts) were mixed in a reaction vessel and hydrated manganese acetate (0.16 part) was added as a catalyst. The reaction mixture was heated at 200° C. under nitrogen for 2¼ hours until the theoretical amount of methanol had been evolved.

Antimony trioxide (0.20 part) was added to catalyse the polymerisation reaction and this was followed by triphenyl phosphite (0.33 part) added as a colour stabiliser.

The reaction mixture was then heated at 245° C. for 45 minutes while passing nitrogen rapidly through the melt. At the end of this period, the pressure and the nitrogen flow were reduced to give a vacuum of 0.1–0.4 mm. Hg. The reaction was discontinued two hours later.

On cooling to room temperature the product was a translucent flexible material which crystallised overnight. The melting point range was observed to be 132 to 136° C. under a hot-stage microscope. The reduced viscosity of a 0.5 gm./100 cc. solution in o-chlorophenol was 0.47 decilitre gm.$^{-1}$ at 25° C.

By analogy with other copolyester preparations, the molar ratio of terephthaloyl units to 6-oxycaproyl units in this copolyester was approximately 53:47.

When the copolyester was used as an adhesive essentially similar results were obtained to those quoted in Example 8.

EXAMPLE 11

A mixture of poly-ε-caprolactone (190 parts), poly(ethyleneterephthalate) (320 parts), with hydrated manganese acetate (0.16 part) as catalyst was heated under nitrogen from 200 to 275° C. during one hour. After one hour at 275° C., a homogeneous melt was obtained. An additional two hours at 275° C. was followed by 45 minutes at 250° C. The reaction was then discontinued.

On cooling to room temperature the product was an off-white crystalline solid which showed a broad melting range terminating at 158° C. The reduced viscosity of a 0.5 gm./100 cc. solution in o-chlorophenol was 0.46 decilitre gm.$^{-1}$ at 25° C. A sample of the product was completely soluble in chloroform. Analysis by the hydrolysis method described in Example 8 indicated that the molar ratio of terephthaloyl units to 6-oxycaproyl units was 53.0:47.0 in this copolyester.

The following results were obtained from adhesion tests on this copolymer.

| Adherends | Breaking stress (lbs. in.$^{-2}$) |
|---|---|
| Aluminium:aluminium | 530 |
| Wood:wood | 365 |

EXAMPLE 12

A reaction mixture consisting of ε-caprolactone (760 parts), poly(ethylene terephthalate) (549 parts), with antimony trioxide (0.33 part) as catalyst and triphenyl phosphite (0.55 part) as a colour stabiliser was heated at 220° C. under nitrogen for 1 hour to obtain a homogeneous melt. The reaction was discontinued after a further 2 hours at 240° C. and 1½ hours at 250° C.

On cooling to room temperature, the product was an off-white crystalline flexible material. The degree of crystallinity, measured in X-ray experiments, was found to be 39%. Differential thermal analysis showed a broad melting range of 110 to 150° C. and this was in agreement with observations under a hot-stage polarising microscope. The reduced viscosity of a 0.5 gm./100 cc. solution in o-chlorophenol was 0.96 decilitre gm.$^{-1}$ at 25° C. Analysis by the hydrolysis method described in Example 8 indicated that the molar ratio of terephthaloyl units to 6-oxycaproyl units was 30.9:69.1 in this copolymer. The product was freely soluble in chloroform.

These observations, when compared with those of Example 2, suggest that this copolymer has a high degree of block character in the sequential distribution of co-units.

EXAMPLE 13

A reaction mixture consisting of ε-caprolactone 253 parts), dimethyl terephthalate (388 parts), dimethyl isophthalate (259 parts), ethylene glycol (450 parts), with hydrated manganese acetate (0.323 part) as catalyst was heated under nitrogen at 200° C. for two hours. At the end of this period the evolution of methanol had ceased.

The temperature was increased to 240° C. and antimony trioxide (0.388 part) was added. The pressure was then reduced over 30 minutes to 0.2–0.05 mm. Hg. After a further 2 hours under these conditions the temperature was increased to 265° C. and the reaction was discontinued 3 hours later.

On cooling to room temperature, the product was a slightly grey, transparent, flexible material. Examination of a sample under a hot stage microscope showed that perceptible flow began at about 85–95° C. The reduced viscosity of a 0.5% solution in o-chlorophenol was 0.66 decilitre gm.$^{-1}$ at 25° C.

Attempts to analyse this copolyester by the hydrolysis methods described in Examples 1 and 8 failed owing to the solubility of the isophthalic acid. However, by analogy with other copolyester preparations the molar ratios of terephthaloyl plus isophthaloyl units to 6-oxycaproyl units in the copolyester are thought to be in the region of 63:37 and the molar ratios of terephthaloyl units to isophthaloyl units are thought to be in the region of 60:40.

The versatility of this copolymer as an adhesive is illustrated by the following observations. Glass to glass lap joints showed breaking stresses of 1,000 p.s.i. Furthermore, no disintegration of the bonds was observed on cooling to −80° C. and below. Excellent peel strengths were obtained when the copolymer was used as an adhesive for Melinex to Melinex (registered trademark) bonds. Even at 40° C. peel strengths of 24 lbs. in.$^{-1}$ were observed.

These properties together with excellent U.V. stability and clarity of this terpolymer indicate the potential for use in the preparation of safety glass laminates and laminates involving poly(ethylene terephthalate) film.

EXAMPLE 14

A reaction mixture of ε-caprolactone (253 parts), dimethyl terephthalate (539 parts), dimethyl isophthalate (108 parts), ethylene glycol (450 parts), with hydrated manganese acetate (0.323 part) as catalyst was heated under nitrogen at 200° C. for 2 hours. The evolution of methanol had ceased at the end of this period.

The temperature was increased to 240° C. and antimony trioxide (0.388 part) was added. After a further 1 hour the pressure was reduced over 30 minutes to 0.2–0.05 mm. Hg. The temperature was then increased further over 30 minutes to 265° C. The reaction was discontinued 2½ hours later.

On cooling to room temperature the product was a slightly grey, transparent, flexible material. After annealing for 24 hours in a drying pistol at 50° C., some crystallisation occurred and a melting point of 110–120° C. was observed under a polarising microscope. The reduced viscosity of a 0.5% solution in o-chlorophenol was 0.47 decilitre gm.$^{-1}$ at 25° C.

Attempts to analyse this copolyester by the hydrolysis method described in Examples 1 and 8 failed owing to the solubility of the isophthalic acid. However, by analogy with other copolyester preparations, the molar ratios of terephthaloyl plus isophthaloyl units to 6-oxycaproyl units in the copolyester are thought to be in the region of 63:37, and the molar ratios of terephthaloyl units to isophthaloyl units are thought to be in the region of 83:17.

When this terpolymer was used as an adhesive for Melinex to Melinex (registered trademark) bonds, peel strengths of 17 lbs. in.$^{-1}$ were observed.

EXAMPLE 15

Samples of aluminium strip and sheet and mild steel strip and sheet were coated with (a) the copolyester as prepared in Example 1, from a 25% by weight solution in methylene chloride and with (b) the copolyester as prepared in Example 1, having dispersed therein 15% by weight of titanium dioxide pigment, from a solution containing 25 gms. of the copolyester per 100 gms. of methylene chloride.

These samples, together with uncoated samples of aluminium strip and sheet and mild steel sheet were immersed in tap water at room temperature for a long period of time.

A sample of aluminium sheet, coated with the copolyester, after immersion for three months, showed no deterioration, and other samples of copolyester coated aluminium sheet, after immersion for two months showed only slight deterioration of the coating at the edges of the sample. A sample of uncoated aluminum sheet, however, showed discolouration and white spots which were the centres of extensive corrosion.

Samples of aluminum strip coated with the copolyester showed only slight discolouration in grey spots on the metal surface after two months' immersion, and samples of aluminium strip coated with the pigmented polymer showed no deterioration, staining, or loss of gloss after two months' immersion. Samples of aluminium strip which had been treated with chromic acid having no copolyester coating, showed bad discolouration with white spots at the centres of severe corrosion sites, and samples of uncoated aluminium strips also exhibited corrosion after immersion for two months.

Samples of mild steel, coated with the copolyester showed some slight corrosion and discolouration near the edges, after two months immersion, but similar samples with the edges wax treated remained in good condition except for very slight edge attack and a few isolated black spots on the metal surface. Samples of uncleaned mild steel strips, coated with the copolyester, showed only slight blistering, and a few black spots on the metal surface after immersion for two months.

Samples of mild steel sheet, coated with the pigmented copolyester, showed no deterioration or staining after two month's immersion.

Samples of uncoated mild steel sheet were severely corroded after two months' immersion.

EXAMPLE 16

Samples of aluminum sheet and strip, and of mild steel sheet and strip were coated with (a) the copolyester as prepared in Example 1, from a 25% by weight solution in methylene chloride, and with (b) the copolyester as prepared in Example 1 having dispersed therein 15% by weight of titanium dioxide pigment, from a solution containing 25 gms. of the polymer per 100 gms. of methylene chloride. The samples were then immersed in 3% by weight aqueous sodium chloride solution for a period of one month. As the end of this time they were removed and examined.

Samples of aluminum strip, coated with the copolyester, were in good condition apart from some very slight blistering of the coating, and similar samples, coated with the pigmented polyester, were also in good condition, the few surface stains being easily removed using a household abrasive cleaner. Samples of uncoated aluminium strip, however, were badly marked.

Samples of aluminum sheet, coated with the copolyester, were well protected apart from some slight corrosion at the edges, while uncoated aluminum sheet was badly marked.

Samples of mild steel strip, coated with the copolyester, showed no deterioration, while similar, uncoated samples were discoloured and corroded.

Samples of mild steel sheet, coated with the copolyester and having waxed edges, showed only slight deterioration at the edges, and similar samples coated with the pigmented copolyester showed only slight deterioration at corners, and at pinholes in the coating. Samples of uncoated mild steel sheet were extensively corroded.

EXAMPLE 17

Samples of aluminium and mild steel were coated with (a) the copolyester as prepared in Example 1, from a 25% by weight solution in methylene chloride, and with (b) the copolyester as prepared in Example 1, having dispersed therein 15% by weight of titanium dioxide pigment, from a solution containing 25 gms. of the polymer per 100 gms. of methylene chloride. The samples were then exposed to the atmosphere on the laboratory roof for a period of 1 month, after which time they were examined for deterioration.

Samples of mild steel sheet, coated with the copolyester, showed deterioration only at the edges of the sample, and similar samples, coated with the copolyester and having waxed edges, showed either no deterioration at all, or only slight deterioration at the edges or at pinholes in the coating. Samples of mild steel strip, which had not been cleaned before coating with the copolyester, showed no signs of deterioration. Samples of uncoated mild steel sheet, on the other hand, were extremely corroded.

Samples of aluminium strip, coated with the copolyester, showed no deterioration, and similar samples, coated with the pigmented copolyester, also showed no signs of deterioration, any stains being easily removed. Samples of uncoated aluminum strip showed some staining.

EXAMPLE 18

Samples of mild steel were coated with the copolyester as prepared in Example 1, from a 25% by weight solution in methylene chloride, and were placed in a controlled relative humidity cabinet for 23 days at a relative humidity of 80% and a temperature of 35° C. No deterioration was apparent in the coated samples, while uncoated samples showed slight rusting.

EXAMPLE 19

Samples of aluminum were coated with (a) the copolyester as prepared in Example 1, from a 25% by weight solution in methylene chloride, and with (b) poly(methyl methacrylate), from a 25% by weight solution in methylene chloride and were placed in a "Xenotester 150" at a relative humidity of 81% and a temperature of 20° C. for 574 hours; this instrument gives radiation of approximately the same spectral distribution as sunlight, but at a much higher intensity. At the end of this time, the copolyester coated samples showed no mechanical or colour deterioration, while in those samples having a poly(methyl methacrylate) coating, the coating peeled off the aluminum, although no colour change was observed.

EXAMPLE 20

Samples of aluminum and mild steel sheet were coated with (a) the copolyester as prepared in Example 1, from a 25% by weight solution in methylene chloride, with (b) poly(methyl methacrylate) from a 25% by weight solution in methylene chloride, and with (c) a mixture of the copolyester as prepared in Example 1 with poly(methyl methacrylate), the two polymers being in equimolar proportions, from a 25% by weight solution in methylene chloride.

The samples were then subjected to intense ultra-violet treatment followed by cold-water treatment. In the aluminium and the mild steel samples coated with poly(methyl methacrylate), this treatment caused a complete breakdown of the coating. Those samples coated with the copolyester, however, only showed slight surface discolouration after 72 hours exposure, and samples coated with the copolyester/poly(methyl methacrylate) mixture changed colour, but did not break down.

EXAMPLE 21

Samples of aluminium sheet were coated with (a) the copolyester as prepared in Example 1, from a 25% by weight solution in methylene chloride, with (b) poly(methyl methacrylate), from a 25% by weight solution in methylene chloride and with (c) mixtures of the copolyester as prepared in Example 1 and poly(methyl methacrylate) in varying molar proportions, from a 25% by weight solution in methylene chloride.

The samples were subjected to severe impact tests in which the samples underwent substantial deformation.

In the poly(methyl methacrylate) coated samples, the coatings became completely detached, whereas in the copolyester coated samples the coating deformed with the metal, without loss of adhesion. In those samples coated with mixtures of the copolyester and poly(methyl methacrylate), the impact strength of the coating increased as the molar proportions of copolyester in the mixture increased.

EXAMPLE 22

Samples of aluminum were coated with the copolyester as prepared in Example 5, from a 25% by weight solution of the copolyester in methylene chloride. The samples were then placed in an oven at 130° C., and maintained at that temperature for 1,000 hours. The samples were then removed and the coatings examined for runs and signs of heat ageing. No such deterioration was apparent. The coatings were found to be slightly soft at 130° C., but did not adhere to a sheet of aluminium placed in contact with the coated samples.

EXAMPLE 23

Samples of aluminium and mild steel were coated with (a) the copolyester as prepared in Example 1, from a 25% by weight solution in methylene chloride and with (b) the copolyester as prepared in Example 5, from a 25% by weight solution in methylene chloride, and tested to determine the effects of Skydrol (registered trademark) 500A (hydraulic fluid) and Lockheed 22 (brake fluid) on the coatings.

Samples of aluminium and mild steel coated with the copolyester as prepared in Example 1 were immersed in Skydrol (registered trademark) 500A. After one day, the coatings became completely separated from the metal, although, even after eight days there was no indication of dissolution of the coating.

The test was then repeated using Lockheed 22 in place of the Skydrol (registered trademark) 500A. In this case the coatings were not affected.

Samples of aluminium sheet, coated with the copolyester as prepared in Example 1, were then placed in contact with cotton wool soaked in Skydrol (registered trademark) 500A. After six days the coating was found to have blistered where it had been in contact with the Skydrol (registered trademark) 500A.

This experiment was then repeated using aluminium and mild steel sheet coated with the copolyester as prepared in Example 5, from a 25% by weight solution of the copolyester in methylene chloride. After 5 days in contact with the Skydrol (registered trademark) 500A, the coating was found to be unaffected except in one sample where it is believed that the Skydrol (registered trademark) had got through a pinhole in the coating and destroyed the bond over a small area.

The above observations illustrate the effect of increasing the proportions of terephthaloyl units in the copolyesters of our invention where resistance to chemicals is required in the coating.

What we claim is:

1. A copolyester suitable as a melt adhesive, having a reduced viscosity, as hereinbefore defined, of at least 0.30 decilitre gm.$^{-1}$, measured on a 0.5 gm. decilitre$^{-1}$ solution of o-chlorophenol at 25° C., machromolecular chains of which comprise 6-oxycaproyl units, ethylene dioxy units and terephthaloyl units, wherein the molar ratios of terephthaloyl units to 6-oxycaproyl units in the macromolecular chains are in the range of 30:70 to 80:20 and wherein the molar ratios of terephthaloyl units to ethylene dioxy units in the macromolecular chains are substantially 1:1.

2. A copolyester according to claim 1 wherein the molar ratios of terephthaloyl units to 6-oxycaproyl units in the macromolecular chains are at least 45:55.

3. A copolyester according to claim 1 which has a reduced viscosity, measured on a 0.5 gm. decilitre$^{-1}$ solution in o-chlorophenol at 25° C., in the range 0.3 to 2.0 decilitres gm.$^{-1}$.

4. A copolyester according to claim 3 which has a reduced viscosity, measured on a 0.5 gm. dicilitre$^{-1}$ solution in o-chlorophenol at 25° C., in the range 0.5 to 1.0 decilitre gm.$^{-1}$.

5. A copolyester according to claim 1 wherein up to 50% of the terephthaloyl units have been replaced by isophthaloyl units.

6. A copolyester according to claim 1 wherein the copolyester has incorporated in the macromolecular chains the residues of one or more tri- or higher polyfunctional compounds acting as branching or cross-linking agents.

7. A copolyester, suitable as a pressure sensitive adhesive, having a reduced viscosity, measured on a 0.5 gram deciliter$^{-1}$ solution in o-chlorophenol at 25° C. of from 0.15 to 0.30 deciliter gram$^{-1}$, macromolecular chains of which comprise 6-oxycaproyl units, ethylene dioxy units and terephthaloyl units, wherein the molar ratios of terephthaloyl units to 6-oxycaproyl units in the macromolecular chains are in the ratio 30:70 to 80:20 and wherein the molar ratios of terephthaloyl units to ethylene dioxy units in the macromolecular chains are substantially 1:1.

References Cited
UNITED STATES PATENTS

| | | | |
|---|---|---|---|
| 2,828,290 | 3/1958 | Caldwell | 260—76 |
| 2,831,832 | 4/1958 | Caldwell | 260—76 |
| 2,895,946 | 7/1959 | Huffman | 260—75 |
| 2,901,466 | 8/1959 | Kibler et al. | 260—75 |
| 3,033,824 | 5/1962 | Huffman | 260—75 |
| 3,169,945 | 2/1965 | Hostettler et al. | 260—78.3 |
| 3,331,890 | 7/1967 | Caldwell et al. | 260—860 |

WILLIAM H. SHORT, Primary Examiner

M. GOLDSTEIN, Assistant Examiner

U.S. Cl. X.R.

117—49, 57, 60, 128.4, 132, 138.8, 142, 145, 138, 155, 213, 230, 232; 161—194, 214, 226, 231, 247, 270; 260—33, 860